United States Patent
Dülfer et al.

(10) Patent No.: US 12,370,556 B2
(45) Date of Patent: Jul. 29, 2025

(54) GRINDING METHOD AND SYSTEM WITH MATERIAL INLET DETECTION

(71) Applicant: Gebr. Pfeiffer SE, Kaiserslautern (DE)

(72) Inventors: Mathias Dülfer, Lahntal (DE); Saskia Kuner, Carlsberg (DE); Florian Tanzmann, Kaiserslautern (DE)

(73) Assignee: GEBR. PFEIFFER SE, Kaiserslautern (DE)

( * ) Notice: Subject to any disclaimer, the term of this patent is extended or adjusted under 35 U.S.C. 154(b) by 295 days.

(21) Appl. No.: 17/920,706

(22) PCT Filed: Apr. 22, 2021

(86) PCT No.: PCT/EP2021/060545
§ 371 (c)(1),
(2) Date: Oct. 21, 2022

(87) PCT Pub. No.: WO2021/214230
PCT Pub. Date: Oct. 28, 2021

(65) Prior Publication Data
US 2023/0166270 A1   Jun. 1, 2023

(30) Foreign Application Priority Data
Apr. 23, 2020 (EP) .................................. 20170999

(51) Int. Cl.
*B02C 25/00* (2006.01)
*B02C 15/00* (2006.01)
*B02C 15/04* (2006.01)
*G01N 15/02* (2024.01)

(52) U.S. Cl.
CPC .............. *B02C 25/00* (2013.01); *B02C 15/00* (2013.01); *B02C 15/04* (2013.01); *G01N 15/02* (2013.01)

(58) Field of Classification Search
None
See application file for complete search history.

(56) References Cited

U.S. PATENT DOCUMENTS 5,386,945 A    2/1995 Nose et al.
2018/0369829 A1*   12/2018 Kaartinen ............... B02C 23/02

FOREIGN PATENT DOCUMENTS

| CH | 636281 A5 | 5/1983 |
| CN | 201500555 U | 6/2010 |
| CN | 102421527 A | 4/2012 |

(Continued)

OTHER PUBLICATIONS

European Search Report mailed Oct. 29, 2020, in EP App. No. 20170999.5 with machine English translation (12 pages).
International Search Report sent Aug. 6, 2021, in International App. No. PCT PCT/EP2021/060545 with English translation (16 pages).
CNIPA; Application No. 202180030335.6; Office Action dated May 24, 2023.

(Continued)

*Primary Examiner* — Jared O Brown
(74) *Attorney, Agent, or Firm* — Fitch, Even, Tabin & Flannery LLP

(57) ABSTRACT

A method for grinding feed material (1) in the form of particulate bulk material is disclosed. In the process, particle sizes of the feed material (1) are detected, and the feed material (1) is ground in a mill (3) on the basis of at least one manipulated variable. The at least one manipulated variable is modified when the proportion of small particle sizes in the detected particle sizes increases. A system for grinding feed material (1) in the form of particulate bulk material is also disclosed.

15 Claims, 1 Drawing Sheet

(56) References Cited

FOREIGN PATENT DOCUMENTS

| CN | 105833939 A | | 8/2016 |
|---|---|---|---|
| CN | 108367297 A | | 8/2018 |
| DE | 1607573 A1 | | 12/1969 |
| DE | 19922449 A1 | | 11/2000 |
| DE | 102009031294 A1 | | 1/2011 |
| DE | 102012100946 B4 | | 12/2017 |
| DK | 87393 | | 7/1993 |
| DK | 176500 B1 | | 6/2008 |
| JP | 07116531 A | | 5/1995 |
| JP | H11-253832 A | | 9/1999 |
| JP | 2009195806 A | * | 9/2009 |
| JP | 2016200518 A | | 12/2016 |
| KR | 20110098159 A | | 9/2011 |
| WO | 2018148832 A1 | | 8/2018 |
| WO | 2020049517 A1 | | 3/2020 |

OTHER PUBLICATIONS

Ma, Tianyu et al., "Prediction model of particle size distribution in continuous ball milling process of bauxite ore," Journal of System Simulation, Feb. 8, 2018, pp. 71-77.

Ningzhong, Hao, "Diagnosability of wood processing equipment failure," Wood processing machinery, Feb. 28, 1997, pp. 31-34.

European Patent Office; Notice of Opposition in corresponding European Patent Application No. 21720283.7-1015/3965940, dated May 6, 2024; 41 pages.

Hastrich, M., et al.; "Maintenance Strategies to Reduce the Downtime of the Quadropol Vertical Roller Mill", Cement International Jun. 2019, vol. 17; 4 pages.

Translation of the International Report on Patentability mailed Nov. 3, 2022, in corresponding International Application No. PCT/EP/2021/060545, (8 pages).

* cited by examiner

GRINDING METHOD AND SYSTEM WITH MATERIAL INLET DETECTION

CROSS REFERENCE TO RELATED APPLICATIONS

This patent application is the national phase of PCT/EP2021/060545, filed Apr. 22, 2021, which claims the benefit of European Patent Application No. 20170999.5, filed Apr. 23, 2020.

TECHNICAL FIELD

The present invention relates to a method for grinding particulate bulk material and a system for grinding feed material in the form of particulate bulk material.

BACKGROUND

It is known in prior art to detect the particle size distribution of ground material. For example, JP 2016-200518 A discloses an image acquisition device between a material storage for the ground material and a mixing device in which water and cement are supplied. According to U.S. Pat. No. 5,386,945 A, the particle size distribution of ground material is consulted for adapting the operating conditions via a parameter model. JP H07-116531A discloses a controlling method for a roller mill with a grinding stock layer thickness sensor.

It is known from WO 2018/148832 A1 that digital image acquisition sensors are provided for measuring a size distribution of rocks in a feed flow to a mill on a conveyor belt. Falling lumps of rock are measured wherein controlling strategies are developed on the basis of the measurement of the parameters of size distribution and hardness of the supplied material.

From US 2018/0369829 A1 a comminuting method for ore is known wherein an image of ore conveyed on a conveyor belt is acquired with a 3D image acquisition system before it is supplied to a grinding cycle. It is in particular disclosed that a particle size distribution profile is determined from which rock size variables can be calculated, including the flow rate or the particle number of certain predetermined smallest or largest percentiles of particles. In particular, a particle number can be determined in a pebble size range corresponding to the respective particle size range to be used as the grinding body in a given mill configuration. These values can be considered for controlling the mill, wherein, among other things, the grinding speed, the mass supply, the water introduction, the ball introduction in ball mills, or the pebble introduction can be controlled. WO 2020/049517 A1 discloses a method for monitoring the properties of iron ore by machine learning for adjusting an ore comminuting apparatus.

SUMMARY

It is the object of the present invention to provide a method and a system for grinding feed material in the form of particulate bulk material having an improved availability and process stability, in particular by reducing the generated vibrations. The availability is defined as the time of the mill during which the final product can be produced. The mill is not available if there are malfunctions or if repair work has to be carried out.

The invention provides a method for grinding feed material in the form of particulate bulk material, wherein first the particle sizes of the feed material are detected and the feed material is then ground in a mill on the basis of at least one manipulated variable. According to the invention, the at least one manipulated variable is modified if the proportion of small particle sizes in the detected particle sizes increases. In particular, the manipulated variable can be automatically modified by a control unit. The control unit can be a computer or microchip with a correspondingly adapted program. As an alternative, however, it is also possible to output an indication, for example a warning signal, to an operator, and the operator will thereupon modify the manipulated variable. The indication to the operator can contain a recommendation for the modification of the manipulated variable. It was recognized that high fineness proportions contribute to an increase of the mill vibration. In the known prior art, however, the opinion prevails that in particular too large proportions of large particle sizes are relevant for vibration generation.

In particular, the proportion of small particle sizes is calculated from the detected particle sizes. In the process, the small particle sizes can in particular be defined as the particles falling below a predetermined size, in particular a predetermined minimum diameter or a predetermined minimum volume. The proportion can in particular be a weight proportion, a volume proportion, or a particle number proportion.

Advantageously, a parameter is calculated which is indicative of the proportion of small particle sizes. The manipulated variable is in particular modified on the basis of this parameter.

In one embodiment, the parameter is calculated by dividing the determined particle number by the particle number maximally detectable by a feed material detection device. The particle number maximally detectable with the feed material detection device in particular depends on the resolution of the feed material detection device and on its arrangement with respect to the feed material. The particle number maximally detectable with the feed material detection device is in particular a fixed parameter of the system by which the method is operated.

The parameter can in particular be calculated on the basis of the diameter for each detected particle. The diameter of each detected particle can be calculated absolutely or in a projected area. The diameter can be determined as an equivalence diameter, a maximum diameter, or a minimum diameter. To determine the maximum diameter or minimum diameter, equivalence areas to the detected projected area of the particles can be determined. The equivalence diameter is in particular the diameter an area of a circle corresponding to the projected area of the detected particles has.

In one embodiment, the parameter is calculated by means of a division of the determined particle number with a diameter of up to a selected mesh size by the determined overall particle number. For this, for each detected particle, the diameter is calculated, in particular by image processing software.

The diameter can in particular be detected in a projected area.

In one embodiment, a projection of the external particle shape of at least a portion of the particulates of the feed material is detected in an image acquisition area. This can be effected, in particular, by means of a digital camera for the portion of the particles exposed in the upper region of the feed material.

The parameter can then be accomplished by means of a division of the sum of the projected areas of the particles with a diameter of up to a selected mesh size by the sum of the projected area of ail particles. For this, the projected area is calculated for each detected particle, in particular by image processing software.

In one embodiment, the volume of the particles is detected. This can be done, in particular, by means of a volume scanner, for example an X-ray scanner. In another embodiment, the volume of the particles is calculated. First of all, a projected area of a camera picture of the particle can be approximated with an area of a circle. By means of the diameter of the approximated area of a circle, the particle volume can then be approximated as a ball. As an alternative, in the projected area of a camera picture of the particle, two orthogonal diameters can be determined, and the particle volume can be approximated as an ellipsoid determined by the two orthogonal diameters in the projected area, and a third diameter orthogonal thereto and corresponding to the smaller or larger one of the two diameters in the projected area. In other embodiments, the volume of the particles can be calculated by camera pictures from various angles.

The parameter can then be effected by means of a division of the sum of the volumes of the particles with a diameter of up to a selected mesh size by the sum of the volumes of all particles. For this, the projected area is calculated for each detected particle, in particular by image processing software.

The aforementioned parameters are higher the higher the proportion of small particle sizes is. The aforementioned parameters are in particular a dimensionless number between 0 and 1. As the proportion of fine particles decreases, the aforementioned parameters decrease.

The selected mesh size is in particular smaller than 8 mm (millimeters), smaller than 6.3 mm, smaller than 5 mm, smaller than 4 mm, smaller than 3 mm, smaller than 2 mm, or smaller than 1 mm. The mesh size is in particular larger than 0.5 mm.

The parameter can in particular be calculated from a cumulative distribution function with respect to the particle sizes. The parameter can in particular be calculated on the basis of a quantile with respect to the diameter of the detected particles. Thus, the parameter can be calculated as the particle diameter a fixed shortfall proportion of the particle diameters falls short of.

The parameter can be obtained from a number-based cumulative distribution function. The number-based cumulative distribution function has a diameter limit value as a function argument, and the quotient all detected particles having a diameter smaller than this diameter limit value divided by the total number of the detected particles as a function value. The parameter is then the diameter value where the function value of the cumulative distribution function corresponds to a fixed shortfall proportion.

The parameter can be obtained from an area-based cumulative distribution function. The area-based cumulative distribution function has a diameter limit value as a function argument, and the quotient of the sum of the areas of all detected particles having a diameter smaller than this diameter limit value divided by the sum of the areas of all detected particles as a function value. The parameter is then the diameter value where the function value of the cumulative distribution function corresponds to a fixed shortfall proportion.

The parameter can be obtained from a volume-based cumulative distribution function. The volume-based cumulative distribution function has a diameter limit value as a function argument, and the quotient of the sum of the volumes of all detected particles having a diameter smaller than this diameter limit value divided by the sum of the volumes of all particles as a function value. The parameter is then the diameter value where the function value of the cumulative distribution function corresponds to a fixed shortfall proportion.

The shortfall proportion is in particular 10%, 50%, or 90%.

The parameters calculated on the basis of a cumulative distribution function or quantiles are smaller the higher the proportion of small particle sizes is.

The manipulated variable is in particular calculated on the basis of the parameter.

The manipulated variable in particular influences the availability of the mill. Production interruptions initialized due to increasing vibrations to protect the mill can be detected early in case of varying feed fineness via parameters and be avoided by means of a modification of the manipulated variables.

In one embodiment, grinding is effected by rotating a grinding plate relative to grinding rollers about a central axis of the grinding plate, so that the grinding rollers roll on a grinding path of the grinding plate about a roller rotation axis. Thus, the mill is a roller mill. The flat arrangement of the feed material on the grinding plate is influenced by the particle sizes of the feed material. Thus, by a too large proportion of small particle sizes, in particular no stable grinding bed can be formed. The resulting continuous breaking down of the grinding bed involves additional vibrations.

In one embodiment, the modification of the at least one manipulated variable causes a reduction of the drive rotational speed of the mill, in particular the grinding plate rotational speed. This in particular permits the reduction of vibrations in the mill. This means, the manipulated variable can be the desired speed or the driving power of the at least one drive of the grinding plate. Thereby, in particular the rotation speed of the grinding plate is controlled on the basis of the particle sizes, that is on the basis of the proportion of small particle sizes in the detected particle sizes. In particular, the grinding plate rotational speed of the mill is reduced by the manipulated variable if the proportion of small particle sizes in the detected particle sizes increases.

In one embodiment, the change of the at least one manipulated variable can cause the reduction of the contact force of at least one rolling element of the mill. This in particular permits the reduction of vibrations in the mill. The rolling element can in particular be the grinding roller of the aforementioned roller mill. The contact force is in particular the force with which the grinding roller is pressed onto the grinding plate, that means the normal force between the grinding plate and the grinding roller. That means, the contact pressure of the grinding roller onto the grinding plate can be controlled on the basis of the particle sizes.

In particular, the grinding roller can be mounted in a rocker arm. The rocker arm can be mounted in a bracket so as to pivot about a bearing axis. The contact force of the grinding roller can in particular be controlled via a linear final control element, advantageously a hydraulic cylinder. The linear final control element is in particular fastened to the rocker arm. That means, the manipulated variable can be the force applied by the linear final control element, or in particular the position of the valve via which hydraulic fluid is supplied to the hydraulic cylinder.

In one embodiment, the modification of the at least one manipulated variable causes the reduction of the feed rate, that means in particular the flow of the feed material, to reduce mill vibration. In particular, the flow rate or the mass flow rate is reduced. The manipulated variable can in particular be the conveying speed of a feed conveyor.

In one embodiment, the modification of the at least one manipulated variable causes the increase of the amount of water introduced into the feed material. This, too, can reduce the vibrations in the mill. In particular, the amount of water introduced into a grinding space of the mill and/or onto the feed material can be increased. The introduced amount of water causes a stabilization of the grinding bed, in particular by forming bridge bonds in the grinding stock to counteract the negative action of the proportion of the small particle sizes.

In a preferred embodiment of the method, a vibration generated by the grinding is detected, and the time history of at least one parameter in view of the vibration, at least one parameter in view of the particle sizes, and at least one parameter in view of the grinding power are stored as operational data set. In particular, discrete values of the at least one parameter at least 3 points in time, preferably at least 10 points in time, further preferred at least 1000 points in time, are stored as an operational data set. Starting from this, in particular a control of the mill is effected in order to increase the systems availability on the basis of the particle sizes while keeping a limit value in view of the parameter of the vibration. The parameter in view of the particle sizes can in particular be the proportion of small particle sizes, but also other parameters in view of the particle sizes, such as, for example, average particle size, variance of the particle size, and/or maximum particle size.

The grinding power is in particular the mass of the final product produced by the mill per time. As an alternative, the grinding power is the energy consumption of the mill with a largely constant mass of the final product per time.

The invention furthermore provides a system for grinding feed material in the form of particulate bulk material, comprising a feed conveyer and a bulk material mill with a vibration sensor. The vibration sensor is designed to detect vibrations during the grinding operation of the bulk material mill. Furthermore, a feed material detection device is provided which is designed to detect at least one parameter of the feed material on the feed conveyor.

According to the invention, a control unit is provided which is designed to control the bulk material mill on the basis of the at least one detected parameter and the detected vibration. The control unit in particular is an electronic control, mainly in the form of a microprocessor with the corresponding inputs and outputs. Advantageously, the electronic control unit executes the method according to the invention by reading out the feed material detection device and activating at least one actuator of the bulk material mill by transmitting the at least one manipulated variable.

The control unit can comprise a camera control unit and a mill control unit which are arranged spaced apart and with data connection. As an alternative, both the control of the camera and of the mill can be integrated in the control unit.

The parameter of the feed material is in particular the particle size of the feed material, advantageously the proportion of small particle sizes. In particular, the control of the bulk material mill is effected by the aforementioned manipulated variables. The correlation of the detected parameter and the detected vibrations permits a precise control of the bulk material mill with a high availability and/or grinding power.

In one embodiment, the control unit includes a data storage, the control unit being configured to store an operational data set on the time history of the at least one parameter of the feed material and at least one parameter with respect to the detected vibrations in the data storage, the control unit being furthermore configured to perform a control of the bulk material mill with reference to the operational data set. In particular, the operational data set includes discrete values of the at least one parameter at at least 3 points in time, preferably at least 10 points in time, further preferred at least 1000 points in time. In particular, control is effected on the basis of the time history of at least one manipulated variable, advantageously of at least two manipulated variables. The manipulated variables are in particular the drive rotational speed, in particular the grinding plate rotational speed of the bulk material mill, the contact force of rolling elements of the bulk material mill, or the water introduction into the feed material or into the bulk material mill.

The control can in particular be effected by critical operating states, that means in particular operating states with increased vibrations, being identified early by means of the time history of the at least one parameter and improved or avoided by modifications of the manipulated variables.

In particular, the control unit includes a data connection means, the control unit being configured for the export of operational data sets, comprising the time history of the at least one parameter of the feed material and at least one parameter with respect to the detected vibration.

The parameter with respect to the detected vibration can in particular be a range indication in which frequency range vibrations exceed a given intensity. In particular, a Fourier transformation with respect to the detected vibrations can be carried out in the control unit for this calculation. Another parameter can be, for example, the indication of the frequency at which the highest vibration intensity is present. A further parameter can be, for example, the intensity or amplitude of the maximum vibration.

In one embodiment, a plurality of vibration sensors can be provided at the bulk material mill. The at least one parameter can then create an averaging or a weighted averaging of the various detected vibrations.

In one embodiment, the control unit can be designed to detect parameters of the final product produced by the mill, in particular humidity and/or temperature and/or particle sizes, and to consider them in the control of the bulk material mill. For this, one or more humidity and/or temperature and/or particle size sensors can be provided in the region of a classifier, separator, conveyor belt and/or air conveyor downstream of the mill. For example, the temperature can be detected by an infrared camera. The humidity can be detected by a humidity sensor arranged in the proximity of the conveyed final product. The particle size sensor can in particular correspond to the feed material detection device, but be directed to the final product, and/or be a camera or a laser granulometer. A parameter can be calculated from a cumulative distribution function with respect to the particle sizes. The particle size, the parameter in this respect, the detected temperature and/or the detected humidity of the final product can be considered for the modification of the manipulated variable.

The particulate bulk material is in particular broken rock material, for example limestone, gypsum, coal or claystone, mineral bulk material, for example cement or cement raw material, or recycled bulk material, for example recycled plaster concrete plate material, blast furnace slag, flue gas gypsum, or flue ash.

The bulk material mill is in particular a roller mill, for example a vertical roller mill, or a bowl mill crusher. In other embodiments, it is, however, also conceivable to employ the invention in the field of ball mills. The methods, systems and uses according to the invention permit to improve the throughput rate, energy efficiency, product fineness and/or system availability. Here, in particular the influence of variations in time of the particle size distributions of the feed material can be detected and considered. In particle size variations in the feed material, particle size extremes, mainly high fineness proportions, contribute to the increase of mill vibration and endanger process stability. Particularly strong vibrations can lead to a damage of the mill if no intervention in the process is made in time. Therefore, a protective shutdown of the mill is here advantageously provided. However, this will then lead to a production stop which is disadvantageous from an economic point of view.

By the invention, events having a negative effect on the mill vibration due to changes of the particle size distribution in the feed material can be detected early and predicted by a control unit. To this end, information on the particle size distribution in the feed material are detected in real time. By means of the information in particular on the fineness of the feed material, the control or adjustment of process parameters to the respective feed material parameter is provided to avoid critical operating states. Vibration-critical operating states can in particular be counteracted by an early modification of manipulated variables, such as, among other things, the resilience of the roller, the amount of introduced water, or the grinding plate rotational speed.

The feed material detection device can in particular comprise a camera system, consisting of at least one, advantageously at least four and in particular up to ten cameras, and at least one, in particular at least four, advantageously at least ten, and in particular up to twenty illumination units. This is supplemented by a control unit which can be provided separately as a camera control unit, or integrated in the mill control unit. The camera system can be provided with a compressed air supply and at least one compressed air nozzle. This brings compressed air onto the lens surface of the at least one camera and/or the at least one illumination unit. This serves to avoid and/or remove dust. Furthermore, a protective camera housing with a cap can be provided. The cap can be designed such that it automatically closes when the compressed air supply is interrupted. For this, a pneumatic closing mechanism can be provided. This permits to prevent a penetration of dust in particular onto the lens surface even in operating breaks or malfunctions. To detect a particle, a resolution of at least 5 pixel per particle should be present. In particular, the at least one camera of the camera system is arranged such that a resolution of at least 5 pixels per millimeter with respect to the feed material is present.

The at least one camera of the camera system can in particular be positioned above the feed belt and be directed to the feed material before it enters the mill. Advantageously, 2D images are detected by the at least one camera at intervals of 0.1 to 5 seconds, advantageously 0.2 to 5 seconds, further advantageously of 0.5 to 1.5 seconds. The detected images are evaluated in the control unit with respect to the particle number and size via image processing algorithms. In particular, image processing filters can convert the images, which are possibly already detected only in a monochrome manner, into binary images. By means of edge-based algorithms, one can determine where individual particles and/or particle accumulations are present. The number of the identified particles is detected. The particle area can be determined by the number of the connected pixels. Starting from these derived parameters in view of the feed material, at least one distribution related to the particle number, the particle area, or the particle volume can be derived, in particular in which particle size range which proportions of particle number, particle area, or particle volume are included.

If the camera control unit is provided separately from the mill control unit, these control units can be connected via a data connection, for example via Ethernet, Profinet or a radio network. The raw data or the already evaluated data are then transmitted thereby from the camera control to the mill control.

In the control unit, in particular in a separate mill control unit, a control algorithm can be implemented, in particular in the form of a computer-implemented process. The control algorithm uses the parameters with respect to the feed material and modifies, on the basis thereof, the control quantities to avoid vibration-critical conditions.

In the camera system, digital cameras can be employed. As an alternative or supplement, laser triangulation systems can be employed in the camera system which can generate 3D image information. From this, too, the size of the individual particles can then be determined.

According to the invention, by using a camera system, the particle size distribution, in particular the fineness change in the feed material, can be used to avoid critical operating states of a bowl mill crusher. The situative influence on manipulated variables to ensure a stable grinding process is accomplished taking into consideration changes of the feed material.

In particular particles having a size of less than 5 mm, less than 3 mm, advantageously less than 1 mm, even more advantageously less than 200 μm (micrometers) are considered as small particle sizes, in particular, according to the invention, a manipulated variable can be modified if the proportion of small particle sizes exceeds 90%, 75%, 50%, or 25% of the total particle number. As an alternative, the at least one manipulated variable can be modified if the volume or mass proportion of the particles with small particle sizes exceeds 90%, 75%, 50%, or 25% of the total mass or the total volume of the feed material.

In particular, in the particle size detection with a camera, a correction value with respect to the particle sizes detected by image acquisition can be employed. Thus, the particles lying on top of the feed material are often larger than the average particle size. This is specific of the system and in particular depends on the piling of the feed material on the feed conveyor. The correction value is in particular smaller than 1. For example, a correction value of 0.75 can be employed. The detected particle size thus results from a multiplication of the correction factor with the particle size acquired by an image.

In one embodiment, the loading condition can be detected transversely to the conveying direction of the feed material. In particular, the cross-sectional area of the piled-up feed material is determined. This can be done, for example, by means of a linear laser. Starting from the loading condition, the detection of the particle sizes can then be specified, in particular by the correction value.

BRIEF DESCRIPTION OF THE DRAWINGS

The invention will be further illustrated below with reference to exemplary embodiments which are represented in the figures. In the drawings

DETAILED DESCRIPTION

Figure 1:
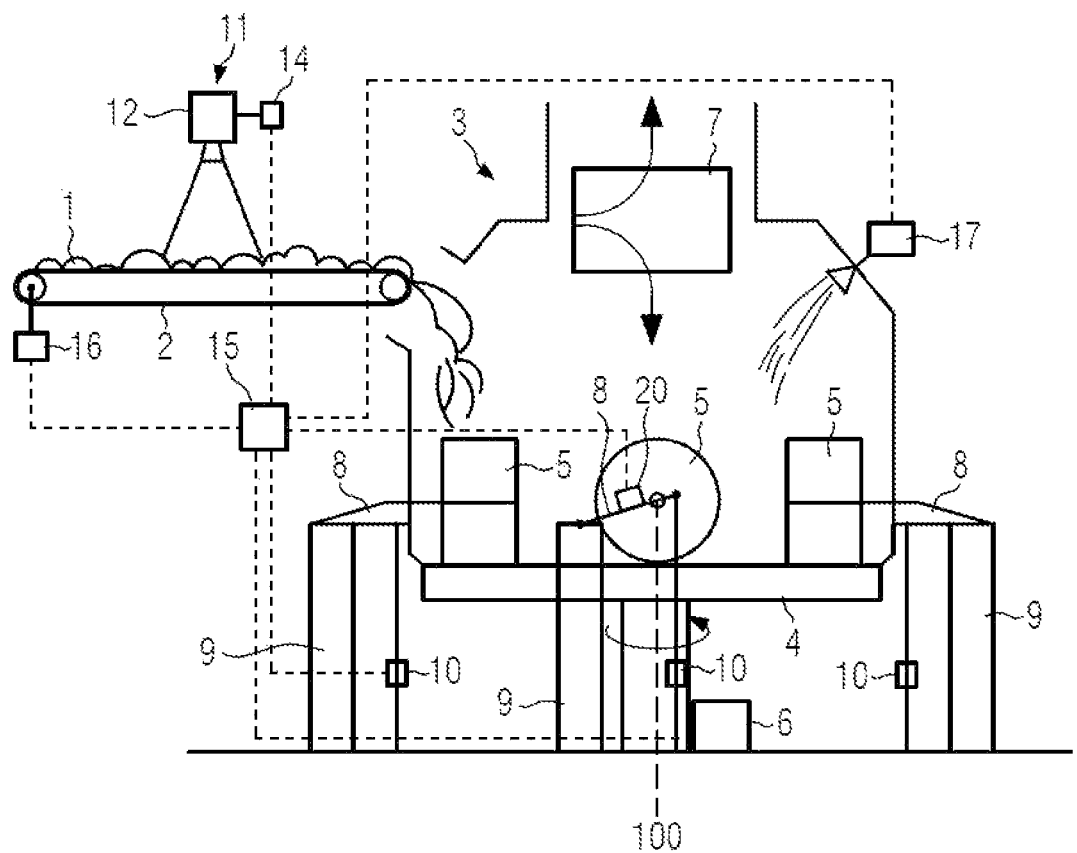
FIG. 1 shows a schematic side view of an embodiment of a system according to the invention.

In FIG. 1, a system for grinding feed material in the form of particulate bulk material, in particular particulate rock material or cement raw material, is shown in a schematic side view. Below, an embodiment of the method according to the invention will also be illustrated in this respect.

The feed material 1 is conveyed on a feed conveyor 2 towards a bulk material mill 3. The bulk material mill 3 includes a grinding plate 4 and a plurality of grinding rollers 5, the grinding plate 4 being rotated about a central axis 100 by means of at least one drive 6, so that the grinding rollers 5 roll on the grinding plate 4. The feed material 1 is ground in the grinding gap between the grinding rollers 5 and the grinding plate 4. The ground feed material 1 is supplied to a classifier 7 by means of an air flow in the outer peripheral region of the grinding plate 4, wherein the classifier lets pass sufficiently finely ground material with the air flow out of the bulk material mill 3 while particles that are too coarse are guided back to the grinding plate 4 and reground again there.

The grinding rollers are each mounted in a bracket 9 via a rocker arm 8. The contact force of the grinding rollers on the grinding plate can be controlled by a linear final controlling element 10 attached to the rocker arm 8. Above the feed conveyor 2, a feed material detection device 11 is provided. The feed material detection device 11 is shown in detail in FIG. 2. The feed material detection device 11 comprises a camera and two illumination means 13. The illumination means 13 illuminate the feed material 1 present on the feed conveyor 2, and the camera 12 acquires a picture of the feed material 1.

The data acquired with the camera 12 are transmitted to a camera control unit 14 and evaluated there by means of image processing algorithms. In particular, the number and size of particles in the acquired image are calculated. Starting from this, the proportion of small particle sizes in the detected particle sizes is calculated. If an increase of the proportion of small particle sizes within the totality of the detected particle sizes occurs, this is indicated to a mill control unit 15 which then modifies at least one manipulated variable in view of the control of the mill.

The feed material detection device 11 is in particular designed to detect the uppermost layer of the feed material piled up on the feed conveyor 2. From the detection of the uppermost layer, the particle size distribution in the total feed material can then be estimated, extrapolated and/or calculated in the camera control unit 14 by means of a system-specific correction value.

The mill control 15 is in particular data-connected with the linear final control element 10 and can thereby control the contact force of the grinding rollers 5 onto the grinding plate 4. Furthermore, the mill control unit 15 is data-connected with the drive 6 of the grinding plate 4 and can thereby control the rotational speed of the grinding plate 4. The mill control 15 can also be data-connected with a drive 16 of the feed conveyor 2 and thereby control the amount of the feed material 1 supplied to the mill per time. Furthermore, the mill control unit 15 can be data-connected with a water injection device 17 by which water can be injected into the grinding space of the mill 3. Thus, the control unit can control the amount of water introduced into the grinding space of the mill.

Figure 2:
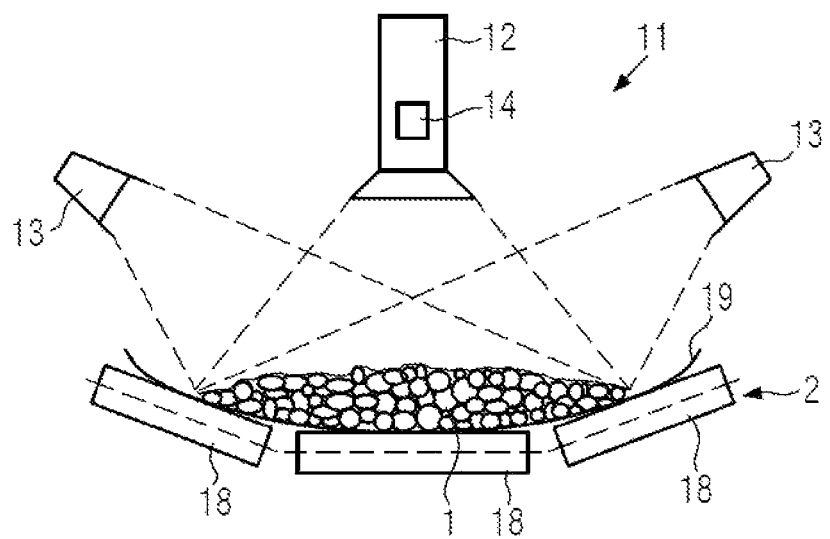
FIG. 2 shows a sectional view in the region of the feed material detection device.

FIG. 2 furthermore represents the more precise construction of a possible feed conveyor 2, wherein in the lateral region, support rolls 18 slightly bent to the top can be provided, so that the conveyor belt 19 of the feed conveyor 2 is shaped concavely transversely to the conveying direction and thus can ensure that no feed material 1 falls down laterally from the feed conveyor 2.

In particular, a bunker can be arranged upstream of the feed conveyor 2 from which a desired amount of feed material is deposited on the feed conveyor 2. The material bunker can be provided with a load cell to be able to effect the discharge of feed material in a controlled manner.

A distributing guide can be arranged upstream of the feed conveyor 2 and convey unsuited feed material not onto the feed conveyor, but to a bunker. In particular, a magnetic detector can be arranged upstream of the distributing guide for this which determines whether magnetic material is contained in the feed material. In this case, the distributing guide is activated such that the feed material is not guided to the feed conveyor 2 but into a bunker.

Furthermore, a vibration sensor 20 can be provided which is designed to detect vibrations during the grinding operation of the bulk material mill 3. In one embodiment, the vibration sensor 20 can be attached, for example, to the rocker arm 8. The vibration sensor can, as an alternative, be attached at the housing of the mill, at the grinding plate 4, at the bearing of the grinding plate 4, or at the bracket 9. In particular, a plurality of vibration sensors can be provided.

The vibration sensor 20 is data-connected to the mill control unit 15. The mill control unit 15 is designed to control the bulk material mill on the basis of the data of the camera control unit 14 and the vibration sensor 20.

The invention claimed is:

1. A method for grinding feed material (1) in the form of particulate bulk material, including the steps of:
   detecting particle sizes of the feed material (1),
   grinding the feed material (1) in a mill (3) on a basis of at least one manipulated variable, and
   modifying the at least one manipulated variable if a proportion of small particle sizes in the detected particle sizes of the feed material (1) increases.

2. The method according to claim 1, further comprising:
   calculating a parameter which is indicative of the proportion of small particle sizes, and
   modifying the at least one manipulated variable on a basis of the parameter.

3. The method according to claim 2, wherein the parameter is calculated by dividing a determined particle number by a maximum number of particles detectable by a feed material detection device.

4. The method according to claim 2, wherein the parameter is calculated on a basis of a diameter for each detected particle, wherein the diameter of each detected particle is calculated based on a projected area of each detected particle, and wherein the parameter is calculated by means of a division of a sum of the projected areas of each of the particles with a diameter of up to a selected mesh size by a sum of the projected areas of all of the particles.

5. The method according to claim 2, wherein the parameter is calculated from a cumulative distribution function with respect to the particle sizes.

6. The method according to claim 5, wherein the cumulative distribution function is volume-based, and wherein the volume-based cumulative distribution function has a diameter limit value as a function argument, and a quotient of a sum of volumes of all detected particles having a diameter smaller than a diameter limit value divided by the sum of the volumes of all detected particles as a function value, wherein the parameter is the diameter limit value where the function value of the cumulative distribution function corresponds to a fixed shortfall proportion.

7. The method according to claim 1, wherein the grinding is performed by rotation of a grinding plate (4) relative to grinding rollers (5) about a central axis (100) of the grinding plate (4), so that the grinding rollers (5) roll on a grinding path of the grinding plate (4) about a roller rotation axis.

8. The method according to claim 1, wherein the modification of the at least one manipulated variable causes a reduction of a drive rotational speed of the mill (3).

9. The method according to claim 8, wherein the drive rotational speed is a rotational speed of a grinding plate.

10. The method according to claim 1, wherein the modification of the at least one manipulated variable causes a reduction of a contact force of at least one rolling element (5) of the mill (3).

11. Method according to claim 1, wherein the modification of the at least one manipulated variable causes a reduction of a mass flow of the feed material (1).

12. The method according to claim 1, wherein the modification of the at least one manipulated variable causes an increase of an amount of water introduced into a grinding space of the mill (3).

13. The method according to claim 1, further comprising: detecting a vibration generated by the grinding, and
storing a time history of at least one parameter in view of the vibration, at least one parameter in view of the detected particle sizes, and at least one parameter in view of a grinding power as an operational data set.

14. A method for grinding feed material (1) in the form of particulate bulk material, including the steps of:
detecting particle sizes of the feed material (1),
grinding the feed material (1) in a mill (3) on a basis of at least one manipulated variable,
modifying the at least one manipulated variable if a proportion of small particle sizes in the detected particle sizes of the feed material (1) increases,
calculating a parameter which is indicative of the proportion of small particle sizes, wherein the parameter is calculated from a cumulative distribution function with respect to the particle sizes, and
wherein the cumulative distribution function is volume-based, and wherein the volume-based cumulative distribution function has a diameter limit value as a function argument, and a quotient of a sum of volumes of all detected particles having a diameter smaller than a diameter limit value divided by the sum of the volumes of all detected particles as a function value, wherein the parameter is the diameter limit value where the function value of the cumulative distribution function corresponds to a fixed shortfall proportion.

15. A method for grinding feed material (1) in the form of particulate bulk material, including the steps of:
detecting particle sizes of the feed material (1),
grinding the feed material (1) in a mill (3) on a basis of at least one manipulated variable,
modifying the at least one manipulated variable if a proportion of small particle sizes in the detected particle sizes of the feed material (1) increases,
detecting a vibration generated by the grinding, and
storing a time history of at least one parameter in view of the vibration, at least one parameter in view of the detected particle sizes, and at least one parameter in view of a grinding power as an operational data set.

* * * * *